United States Patent [19]

Clegg

[11] Patent Number: 4,612,467
[45] Date of Patent: Sep. 16, 1986

[54] ELECTROMAGNETIC RECIPROCATOR

[76] Inventor: John E. Clegg, 2320 Keystone Dr., Orlando, Fla. 32806

[21] Appl. No.: 691,782

[22] Filed: Jan. 16, 1985

[51] Int. Cl.$^4$ ............................................. H02K 33/00
[52] U.S. Cl. ........................................ 310/27; 310/13
[58] Field of Search ............... 310/15, 30, 27, 13, 310/23, 24, 34, 35, 12; 290/1, 113

[56] References Cited

U.S. PATENT DOCUMENTS

| | | | |
|---|---|---|---|
| 1,851,850 | 3/1932 | Lamar | 310/35 |
| 2,121,895 | 6/1938 | Toward et al. | 310/35 |
| 2,628,319 | 2/1953 | Vane | 310/15 |
| 2,944,160 | 7/1960 | Dickinson | 310/15 X |
| 3,176,170 | 3/1965 | Fulton et al. | 310/12 |
| 3,439,198 | 4/1969 | Lee | 310/27 X |
| 3,484,629 | 12/1969 | Kunz | 310/15 |
| 3,968,387 | 7/1976 | Scarff | 310/30 X |

*Primary Examiner*—Donovan F. Duggan

[57] ABSTRACT

A stator comprising a cylindrical permanent magnet and a helical charging coil wound thereon and embedded inside a cylindrical plastic casing, and a reciprocator comprising two cylindrical electromagnets with helical charging coils wound thereon and a helical charging coil embedded inside a hollow cylindrical plastic casing enclosing the stator. The two electromagnets are mounted at opposite ends of the permanent magnet and are axially aligned therewith, with an intervening space to allow for longitudinal movement of the electromagnets. The helical charging coil occupies the electromagnetic field of the permanent magnet.

The helical charging coils of the electromagnets are wound in opposite directions so that when one electromagnet attracts one end of the permanent magnet, the other electromagnet repels the opposite end. A reciprocating reverse-circuit switch reverses the circuit through the electromagnets which alternately attract and repel the permanent magnet, and the reciprocator carries the helical discharging coil back and forth through the electromagnetic field of the permanent magnet, discharging by induction the electricity which had been stored in the permanent magnet by the helical charging coil.

The device is a simple and efficient means of storing and retrieving electricity in large quantities.

1 Claim, 2 Drawing Figures

U.S. Patent   Sep. 16, 1986   4,612,467
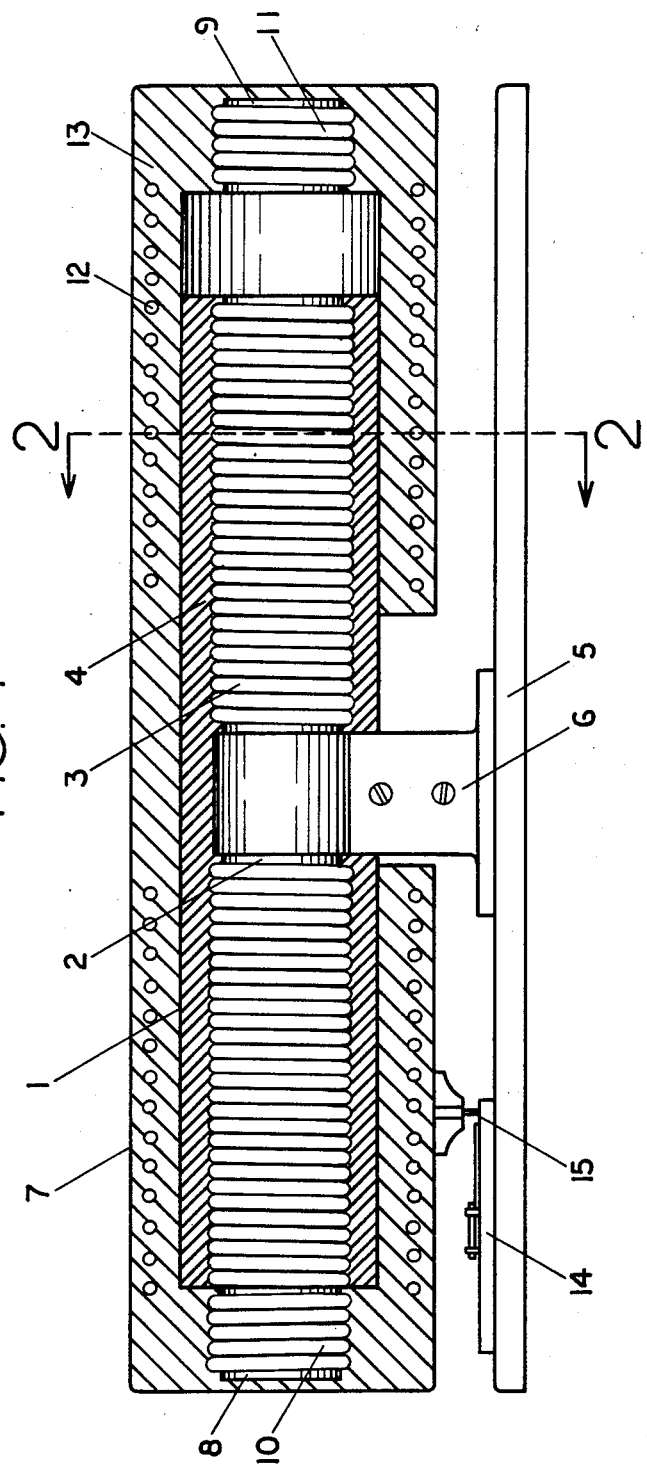
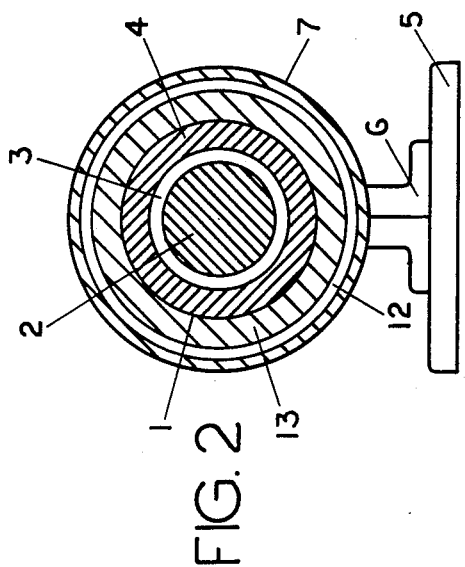

ELECTROMAGNETIC RECIPROCATOR

BACKGROUND

Prior art includes four patented inventions which are similar in some regards to the subject invention, as follows;

1. Electric Impact Motor, U.S. Pat. No. 1,851,850, Mar. 29, 1932, by D. H. Lamar.
2. Electric Power Apparatus, U.S. Pat. No. 2,121,895, June 28, 1938, by W. Toward et al.
3. Electric Hammer, U.S. Pat. No. 2,628,319, Feb. 10, 1953, by A. Vang.
4. Reciprocating Motor Structure, U.S. Pat. No. 3,484,629, Dec. 16, 1969, by Paul Albert Kunz.

Each of these inventions features a cylindrical permanent magnet mounted inside helical coils through which the current is reversed to produce reciprocation of the permanent magnet and related members. The purpose of the inventions is defined by the titles.

None of the inventions have helical discharging coils which serve as the means of retrieving electricity stored in the permanent magnet, this being the purpose and distinguishing feature of the subject invention.

DRAWINGS

FIG. 1 is an elevation of the electromagnetic reciprocator.

FIG. 2 is a cross section taken on line 2—2 of FIG. 1.

DESCRIPTION

FIG. 1 is an elevation of the electromagnetic reciprocator comprising stator 1 with cylindrical permanent magnet 2 and helical charging coil 3 wound thereon and embedded inside cylindrical plastic casing 4 and mounted on base 5 by bracket 6, and comprising reciprocator 7 with two identical cylindrical electromagnets 8 and 9, two identical helical charging coils 10 and 11 would thereon and helical discharging coil 12 embedded inside hollow cylindrical plastic casing 13.

Electromagnets 8 and 9 are mounted at opposite ends of permanent magnet 2 and are axially aligned therewith and are separated therefrom by an intervening space to allow for longitudinal movement of the reciprocator 7 and its parts.

Helical discharging coil 12 occupies the magnetic field of permanent magnet 2.

Helical charging coils 10 and 11 are wound in opposite directions so that when one electromagnet 8 or 9 attracts permanent magnet 2, the other electromagnet 8 or 9 repels.

FIG. 1 shows reciprocating reverse-circuit switch 14 mounted on base 5 and engaging reciprocating pin 15 mounted on the base of reciprocator 7. Pin 15 reciprocates through a longitudinal groove (not shown) in switch 14 and reverses the circuit through helical charging coils 10 and 11 when reaching an end of the longitudinal groove, causing the electromagnets 8 and 9 to alternately attract and repel permanent magnet 2.

In operation, a direct current is passed through helical charging coil 3, charging (magnetizing) permanent magnet 2 and storing electromagnetic force therein. Permanent magnet 2 will remain magnetized indefinitely so long as it is spatially isolated from demagnetizing metals. When electricity is to be drawn from permanent magnet 2, a direct current is passed through reverse-circuit switch 14 to helical charging coils 10 and 11. Electromagnets 8 and 9 alternately attract and repel opposite ends of permanent magnet 2, moving reciprocator 7 right and left and carrying discharging coil 12 back and forth through the magnetic field of permanent magnet 2. An alternating electric current is induced in discharging coil 12, and the electricity stored in permanent magnet 2 is recovered.

A possible modification of the electromagnetic reciprocator described above would be to use solenoids to replace electromagnets 8 and 9.

I claim:

1. An electromagnetic reciprocator comprising in general a permanent magnet which receives a direct electric current from a helical charging coil and converts the current into a magnetic field, and a helical discharging coil which reciprocates through the magnetic field and induces an alternating electric current therefrom, as means of storing and retrieving electricity; and comprising in particular;

a stator (1) comprising a cylindrical permanent magnet (2) embedded in a cylindrical plastic casing (4) and mounted by appropriate means to a horizontal base (5);

a helical charging coil (3) wound on the opposite ends of said permanent magnet (2) inside said plastic casing (4);

a reciprocator (7) comprising two identical cylindrical electromagnets (8,9) mounted at opposite ends of said permanent magnet (2), axially aligned therewith and spatially separated therefrom; comprising two identical helical charging coils (10,11) wound on said electromagnets (8,9); comprising a helical discharging coil (12) encircling said permanent magnet (2) and occupying the magnetic field thereof; comprising a hollow cylindrical plastic casing (13) enclosing said cylindrical plastic casing (4) and embedding said cylindrical electromagnets (8,9), said helical charging coils (10,11), and said helical discharging coil (12);

a reciprocating pin (15) having an upper end mounted vertically in the bottom of said hollow cylindrical plastic casing (13) at one end thereof;

a reverse-circuit switch (14) mounted on said base (5) below said reciprocaing pin (15); said reverse-circuit switch (14) having a longitudinal groove which is aligned with the longitudinal axis of said reciprocator (7) and which engages a lower end of said reciprocating pin (15);

said stator (1) serving as the stationary member of the electromagnetic reciprocator;

said permanent magnet (2) serving as means of receiving and converting a direct electric current into a polarized magnetic field;

said helical charging coil (3) serving as means of conducting a direct electric current to said permanent magnet (2);

said cylindrical plastic casing (4) serving as embedding means of said permanent magnet (2) and said helical charging coil (3), and serving as mounting means on which said hollow cylindrical plastic casing (13) reciprocates;

said reciprocator (7) serving as the reciprocating member of the electromagnetic reciprocator;

said two electromagnets (8,9) serving as means of receiving and converting a direct electric current into two polarized electromagnetic fields of opposed polarity, and serving as means of simultaneously attracting and repelling opposite ends of said permanent magnet (2) so as to create reciprocating rectilinear movement of said reciprocator (7);

said two helical charging coils (10,11) serving as means of conducting a direct electric current to said two electromagnets (8,9);

said helical discharging coil (12) serving as means of inducing an alternating electric current from the magnetic field of said permanent magnet (2) by reciprocating therethrough;

said hollow cylindrical plastic casing 13 serving as embedding means of said electromagnets (8,9), said helical charging coils (10,11), and said helical discharging coil (12);

said reciprocating pin (15) serving as operating means of said reverse-circuit switch (14); and said reverse-circuit switch (14) serving as means of reversing the circuit of a direct electric current flowing to said two electromagnets (8,9) when said reciprocating pin (15) reaches an end of said longitudinal groove and reverses the direction of travel of said reciprocating pin (15) in said longitudinal groove.

* * * * *